Patented Apr. 8, 1930

1,754,068

UNITED STATES PATENT OFFICE

JOHN T. TRAVERS, OF COLUMBUS, CHARLES H. LEWIS, OF HARPSTER, AND OLIVER M. URBAIN, OF COLUMBUS, OHIO, ASSIGNORS, BY DIRECT AND MESNE ASSIGNMENTS, TO THE OHIO SANITARY ENGINEERING CORPORATION, OF COLUMBUS, OHIO, A CORPORATION OF OHIO

PROCESS OF WATER PURIFICATION

No Drawing.   Application filed August 27, 1928.   Serial No. 302,442.

This invention relates to a process of water purification, and in its more specific aspect contemplates the elimination of the polluting phenolic bodies from the water.

Many of the water supplies in this country, particularly those in the areas where the population is concentrated and industrial plants are prevalent, are polluted by the presence of phenols in various concentrations. It will be recognized that the presence of phenols, even in relatively small concentrations, have a toxic effect upon fish life and impart to the water a most disagreeable taste and odor, rendering it impossible for use as a city water supply. The phenols in a water supply are extremely stable and are not oxidizable by any natural agencies. When a water supply is treated by the conventional chlorination treatment the phenols take the form of chloro-phenol and chloro-cresol, which compounds are fully as disagreeable and contaminating as the parent phenol. Phenols are found in city water supplies and in the waste waters discharged from various industrial plants in varying concentrations. Even in an extremely small concentration, phenols have a most disastrous polluting effect. We have found that in a concentration as low as one part in five hundred million parts in water, a very disagreeable odor and taste are produced. Our process is adapted to treat phenol solutions in any concentration. It will, however, be only in rare instances where solutions greater than 1000 parts per million will be found.

The presence of phenols in a solution may be readily ascertained by the Fox and Gage method, used by the American Water Works Association, or by the Gibbs method, employed by the United States Public Health Service.

The term, "phenols" as generally employed in this specification is defined as the hydroxy derivates of benzene, resulting from the substitution of an OH group for one or more atoms of hydrogen on the benzene molecule. Common phenol, so called, is a mono-hydroxy-benzene, having the formula, $C_6H_5OH$. It is the most common of all the phenols. The other three principal phenols are, ortho-cresol, meta-cresol and para-cresol. The formula of these three cresols is, $CH_3C_6H_4OH$ and they differ in structure only in their structural formulas.

Common phenol, that is, the mono-hydroxy-benzene, having the formula $C_6H_5OH$ comes from various sources, but more especially from the operation of coke ovens, tar stills, coal gas plants and the like, as well as from the urine and feces constituents of sewage.

Such specific phenols as ortho-cresol and meta-cresol, are found only in the wastes from the commercial plants, whereas the specific phenol, para-cresol, has as its source, the urine and feces of sewage. The albuminous matter content of sewage also forms a source of phenol and para-cresol, these being formed as a result of the decomposition of the albuminous matter.

It is generally conceded that when sewage is mixed with phenol wastes of relatively low concentration, in a ratio of approximately 9 parts of sewage to 1 part of phenol waste, that the phenols are removed. We have found that it is true that phenols are adsorbed by the suspended matter content of sewage when phenol wastes and sewage are combined in these proportions. This adsorption of the phenols by the sewage is effected, however, only under aerobic conditions and as a result of agitation.

We have, however, further found that the phenols are in no wise destroyed or broken down as a result of this adsorption, but that if, and when the sewage, which has adsorbed the phenols, is subjected to anaerobic conditions, it will again give up the adsorbed phenols. The common phenol and para-cresol content of the urine and feces in sewage is in solution and at once passes into the diluent water of the receiving stream. Some of this phenol and para-cresol may be adsorbed by suspended matter present in the sewage, if subjected to aerobic conditions. It must be appreciated that sewage is seldom subjected to aerobic conditions, and further that the suspended matter of sewage which eventually becomes the sewage sludge, settles to the bottom of receiving bodies of water where it is subjected to anaerobic conditions, particularly so when such bodies of water are frozen over during the winter months. When the suspended matter, which has adsorbed the phenols in their various forms, has settled to the bottom of a body of water and is there subjected to anaerobic conditions, it merely acts as a storage house for phenols which it continuously gives up to the water, thus polluting the same. These conditions are known to exist in portions of Lake Erie and in many of the streams of the industrial states. Due to the extreme stability of phenols and to the fact that they are non-oxidizable by natural agencies, they remain as more or less permanent polluting agents in a body of water.

It is the object of our invention to remove phenols from water by breaking down and destroying the phenols, regardless of the form in which they may be present in the water. By our process we are enabled to completely remove the phenols from water.

Briefly described, our process comprises treating the polluted phenol solutions with a treating mixture containing either ferrous hydroxide, ferric hydroxide, or ferrous sulphate (which will yield ferrous hydroxide when in solution), calcium hydroxide and either marl clay or a waste dust, derived from the manufacture of cement, previously treated with acid. These constituents of the treating mixture are preferably combined in the following manner:

|   | Parts |
|---|---|
| Ferrous sulphate | 15 |
| Calcium hydroxide | 20 |
| Marl clay or waste dust | 65 |

If an hydroxide of iron is used in making the mix in lieu of ferrous sulphate, it will be appreciated that the hydroxide of iron need not represent as much as 15% of the mix.

By the expression,—"Waste dust from the manufacture of cement, previously treated with acid", as used in this specification, we mean, waste dust collected from the precipitators employed in the manufacture of cement which waste dust has been treated with sulphuric acid in a quantity sufficient to practically neutralize all free lime and calcium carbonate in the dust.

While the above percentages of the constituents of the treating mixture have been found effective in actual use, it will be understood that these percentages may vary somewhat. We find, however, that the calcium hydroxide must be used in an amount adequate to maintain the hydroxyl ion concentration of the solution such that its pH value is above 10.8. We furthermore find that the quantity of the marl employed will, to some extent, depend upon the concentration of the phenols in the solution treated. In no instances should a mixture be employed in an amount which will supply less than 4.4 grains per gallon of either ferrous hydroxide or ferric hydroxide to the solution, or which will supply less than 14.8 grains of free calcium hydroxide per gallon of the solution, nor less than 30 grains of either marl clay, or waste dust previously treated with acid, per gallon of the solution treated.

A further important feature of our process resides in the fact that a time factor is necessary to bring about the elimination of the phenols. We find that a time period in excess of ten minutes is essential to the elimination of the phenols.

We are certain that the phenols enter into reaction with certain of the constituents of the treating mixture, and it is our belief that they react more especially with the ferrous or ferric hydroxide content and the calcium hydroxide content of the mixture. That the phenols are definitely eliminated, we are certain, since no trace of phenols is found either in the effluent produced by our process, or in the sludge derived therefrom.

To the end that the theory underlying our process may be more definitely understood, we submit the following discussion of experimentation carried out by us:

We have definitely ascertained that in treating phenol wastes with ferrous hydroxide or ferric hydroxide alone, a substantial removal of phenols can be effected, but a complete removal of the phenols is impossible. We have further found that by treating phenol wastes with calcium hydroxide alone, a substantial removal of phenols can be effected, but that a complete removal of the phenols by this method, is likewise impossible. We have furthermore found that a combination of ferrous hydroxide or ferric hydroxide will effect, with calcium hydroxide, a substantial removal of phenols, but that this combination will not effect a complete removal of the phenols. We have furthermore ascertained that when phenol wastes are treated with marl clay alone there is no removal of phenols from the waste. When phenol wastes are treated with the waste dust, from the manufacture of cement, previously treated with acid, a partial removal of the phenols from the wastes is effected. This partial removal, we attribute to the presence of the iron in the waste dust.

We have found that when marl is combined with ferrous hydroxide or ferric hydroxide, and the phenol wastes treated with this mixture, the quantity of phenols removed is not increased over the quantity removed by the ferrous hydroxide or ferric hydroxide used alone. We have also found that when calcium hydroxide is used in combination with marl clay, the quantity of phenols removed is not increased over that removed by the calcium hydroxide alone. When, on the other hand, waste dust, previously treated with acid, is combined with ferrous hydroxide or ferric hydroxide, the quantity of phenols removed is somewhat more than that removed by the ferrous hydroxide or ferric hydroxide used alone. This increase is, however, only proportional to the iron content of the waste dust. The same is true when the phenol wastes are treated with calcium hydroxide and waste dust previously treated with acid in combination.

We find that a complete removal of the phenols can only be obtained when we employ the three ingredients, ferrous hydroxide or ferric hydroxide, calcium hydroxide, and either marl clay or waste dust previously treated with acid. The calcium hydroxide must be employed in an amount sufficient to maintain the pH of the solution above 10.8, whereas, we have found that the iron content must be adequate to supply at least 4.4 grains per gallon of the water treated. Since complete removal of phenols cannot be effected by employing either ferrous hydroxide or ferric hydroxide, or calcium hydroxide alone, and since no removal of phenols is effected by the use of marl alone, and since the removal of phenols effected by the waste dust, previously treated with acid, is not beyond that which would be effected by the iron content of the waste dust, it is our belief that some constituents of the marl clay function as a catalyst to facilitate the reaction between the ferrous hydroxide, ferric hydroxide and calcium hydroxide with the phenols, as well as do some constituents of the waste dust.

Since we have found that it is necessary that the pH of the solution be maintained above the pH value 10.8, it is also our belief that the catalyst does not become effective at a pH below this value.

We are not, as yet, certain of the character of the reactions which are effected in our process. It is our belief, however, that the reactions result either in the formation of an odorless, tasteless organic compound,— resulting from the breaking down of the phenols, or in the formation of an addition product or new combination insoluble in the solution, which precipitates out with the sludge.

As illustrative of one manner of carrying out the process, we here give the résumé of the treatment of a phenol solution having a concentration of 200 parts per million. This solution was treated with 120.18 grains of a treating mixture composed of,

| | Per cent |
|---|---|
| Ferrous sulphate | 15 |
| Calcium hydroxide | 20 |
| Marl clay | 65 |

It will be understood that the ferrous sulphate when introduced into the solution, forms ferrous hydroxide as a result of the reaction between the calcium hydroxide and ferrous sulphate.

As a result of the mixing of 120.18 grains of the treating mixture per gallon of the phenol solution, there is formed 5.81 grains of ferrous hydroxide and 19.27 grains of free calcium hydroxide, which raises the pH of the solution to 11.6. The solution was retained in a quiescent condition for a reaction period of 15 minutes, following which the effluent was separated from the sludge. On testing the effluent it was found to be tasteless, odorless and entirely free from phenol, and upon distillation of the sludge it yielded no phenol, clearly disclosing that the phenomenon is not one of adsorption, but one of chemical reaction.

What we claim for our invention is:

1. A process for eliminating phenols from water, comprising incorporating in the phenol solution a mixture containing hydroxide of iron, calcium hydroxide and a catalyst bearing material, and incorporating the mixture in the solution in such proportions that the hydroxide of iron will be present in the solution in a quantity not less than 4.4 grains per gallon, the calcium hydroxide being present in the solution in a quantity not less than 14.8 grains per gallon, and the catalyst bearing material being present in the solution in the quantity of not less than 30 grains per gallon.

2. A process for eliminating phenols from water polluted therewith, comprising maintaining the hydroxyl ion concentration of the solution above the value, pH 10.8 and incorporating in the solution an hydroxide of iron in an amount adequate to supply an excess of 4.4 grains per gallon of the solution and a catalyst bearing material in a quantity adequate to supply in excess of 30 grains per gallon in the solution treated.

3. A process for eliminating phenols from water polluted therewith, comprising maintaining the hydroxyl ion concentration of the solution above the value, pH 10.8, and incorporating in the solution an hydroxide of iron and a catalyst, and subjecting the solution to a time period reaction in excess of 10 minutes.

4. A process for eliminating phenols from water polluted therewith, comprising maintaining the hydroxyl ion concentration of the solution above the value, pH 10.8 and incorporating in the solution an hydroxide of iron in an amount adequate to supply an excess of 4.4 grains per gallon of the solution and a catalyst bearing material in a quantity adequate to supply in excess of 30 grains per gallon in the solution treated, and subjecting the solution to a time period reaction in excess of ten minutes.

5. A process for eliminating phenols from water, comprising reacting on the solution with an hydroxide of iron in the presence of a catalyst bearing material, maintaining the hydroxyl ion concentration of the solution above the value pH 10.8, and subjecting the solution to a time period of reaction in excess of ten minutes.

6. A process for eliminating phenols from waters polluted therewith, comprising reacting on the solution with an hydroxide of iron, the hydroxide of iron being present in the solution in a quantity in excess of 4.4 grains per gallon, effecting the reaction in the presence of a catalyst, maintaining the hydroxyl ion concentration of the solution at a value above pH 10.8, and subjecting the solution to a time period of reaction in excess of ten minutes.

7. A process for eliminating phenols from waters polluted therewith, comprising reacting on the solution with an hydroxide of iron in the presence of a quantity of marl clay and maintaining the hydroxyl concentration of the solution, during a time period of reaction of at least 10 minutes, above the value pH 10.8.

8. A process for eliminating phenols from waters polluted therewith, comprising reacting on the solution with an hydroxide of iron in the presence of a quantity of marl clay and maintaining the hydroxyl concentration of the solution, during the period of reaction above the value pH 10.8, and maintaining the time period of reaction in excess of ten minutes.

9. A process for removing phenols from waters polluted therewith, comprising reacting on the solution with a mixture containing an hydroxide of iron, calcium hydroxide and marl clay, the hydroxide of iron being present in the mixture in a quantity adequate to supply not less than 4.4 grains per gallon, the calcium hydroxide being present in a quantity adequate to supply not less than 14.8 grains of free calcium hydroxide per gallon, and the marl clay being present in the mixture in a quantity adequate to supply not less than 30 grains per gallon.

10. A process for removing phenols from waters polluted therewith, comprising reacting on the solution with a mixture containing an hydroxide of iron, calcium hydroxide and marl clay, the hydroxide of iron being present in the mixture in a quantity adequate to supply not less than 4.4 grains per gallon, the calcium hydroxide being present in a quantity adequate to supply not less than 14.8 grains of free calcium hydroxide per gallon, and the marl clay being present in the mixture in a quantity adequate to supply not less than 30 grains per gallon, and subjecting the solution to a time period of reaction in excess of 10 minutes.

JOHN T. TRAVERS.
CHARLES H. LEWIS.
OLIVER M. URBAIN.